(12) United States Patent
Jones

(10) Patent No.: US 6,258,265 B1
(45) Date of Patent: Jul. 10, 2001

(54) WATER PURIFYING APPARATUS HAVING A PLURALITY OF PURIFYING STAGES AND MODULAR ION EXCHANGE MEDIA CONTAINERS

(76) Inventor: James Phillip Jones, 2809 Sue Dr., Jefferson City, MO (US) 65109

(*) Notice: Subject to any disclaimer, the term of this patent is extended or adjusted under 35 U.S.C. 154(b) by 0 days.

(21) Appl. No.: 09/419,023

(22) Filed: Oct. 15, 1999

(51) Int. Cl.$^7$ .................................................. C02F 9/00
(52) U.S. Cl. ................... 210/202; 210/223; 210/259; 210/266; 210/282; 210/284
(58) Field of Search .................... 210/663, 669, 210/685, 694, 695, 748, 202, 223, 259, 266, 282, 900, 284

(56) References Cited

U.S. PATENT DOCUMENTS

| | | | |
|---|---|---|---|
| 4,302,677 | 11/1981 | Albertsson et al. | 250/429 |
| 4,336,223 | 6/1982 | Hillman | 422/24 |
| 5,128,043 | * 7/1992 | Wildermuth | 210/695 |
| 5,827,431 | 10/1998 | Jones | 210/688 |
| 5,965,093 | 10/1999 | Adams | 422/186.04 |

FOREIGN PATENT DOCUMENTS

| | | |
|---|---|---|
| 3840276 | 5/1990 | (DE). |
| 03072992 | 3/1991 | (JP). |
| 09206762 | 8/1997 | (JP). |
| 93/23336 | 11/1993 | (WO). |
| 99/32409 | 7/1999 | (WO). |

* cited by examiner

Primary Examiner—Ivars Cintins

(57) ABSTRACT

An apparatus and associated methods for purifying water are provided. The apparatus preferably includes a supply of unpurified water, a contained magnetic field positioned downstream from the unpurified water supply to remove particles containing ferrous metal therefrom when the unpurified water passes therethrough, an ion exchange media exposer positioned downstream from the contained magnetic field for exposing the water having the ferrous metal containing particles removed therefrom to ion exchange media having first and second conductivity types to thereby remove charged molecules from the water, a carbon filter positioned downstream from the ion exchange media exposer for filtering the water having the charged molecules removed therefrom, a paper filter positioned downstream from the carbon filter for filtering precipitates from the water after passing through the carbon filter, and an ultraviolet light exposer positioned downstream from the paper filter for exposing the water after passing through the paper filter to ultraviolet light to thereby kill all life forms therein.

11 Claims, 12 Drawing Sheets

WATER PURIFYING APPARATUS HAVING A PLURALITY OF PURIFYING STAGES AND MODULAR ION EXCHANGE MEDIA CONTAINERS

FIELD OF THE INVENTION

The present invention relates to the water treatment industry and, more particularly, to the field of water purification and methods of purifying water.

BACKGROUND OF THE INVENTION

Currently, the quality of the global supply of pure drinking water is decreasing at a far faster rate than the population is growing. Simple analysis would lead one to the conclusion that if this problem is not successfully addressed at this time, humanity shall cease to exist, as shall all living forms of life as we know and understand it. The United Nations International Children's Educational Foundation (UNICEF) estimates that every single day 20,000–30,000 children die of waterborne disease, i.e., typhoid, cholera, malaria, *e-coli,* etc. Also, newspapers report the presence of toxins in deep wells on a regular basis, as well as the contamination of reservoirs built to meet the population requirements in the 1930's. These reservoirs have been used as recreational resort areas where speed boats have spewed their partially burned fossil fuel saturated exhaust directly into the water, and floating gasoline slicks are spotted without even having to search. The Environmental Protection Agency ("EPA") has already declared many of these reservoirs too contaminated for human consumption.

The landfills in this country, as well as the farmer's pesticides and fertilizers, have percolated down through the water tables across this country and across the industrialized nations of the world to the point that springs and wells are now testing positive for this spectrum of toxins. Numerous huge municipalities and small communities throughout the world dump raw sewage into our lakes, streams and rivers, dumping raw sewage downstream while pumping drinking water from the very same stream upstream of the sewage dump section for purification and for human consumption.

Numerous water filters have been introduced for use by the public in their homes; however, the greatest effort that heretofore has been made available for "pure drinking water" is a three stage device. This device is made by Alpine, and upon inspection, it does little to purify water. This device utilizes ozone (O3) generation; a UV lamp that is weak, and not effective to adequately kill microorganisms; and a carbon filter disc. Flow rates are not constant; therefore, it could not be rated at any specific kill rate due to the fact that the flow rate is never the same because it is determined by the user who turns on the faucet. Secondly, if ozone is really being generated in the grid in the bottom of this see-through plexiglass cylindrical device, if the bubbles are able to bypass the carbon disc around the edges, simple physics would dictate that water will always take the course of least resistance and it will also bypass the carbon disc.

Another device that is advertised nationally and very frequently is a device known as the Britta. It is a single stage filter utilizing the laws of gravity and a carbon block. Water is poured into the top holding container and gravity slowly pulls the water through the carbon block. The water is then held in a container that looks very much like a Mr. Coffee pot. Carbon (C) does reduce many toxic chemicals and gases from water; however, it does not purify the water. This device is also limited greatly by the capacity of water that it can produce in a 24 hour period. It most certainly would not be able to produce enough filtered water to supply a family of four with enough drinking and cooking water for an entire day. Furthermore, how does one determine when the carbon in this unit is saturated and no longer removing contaminants from the water. Any carbon block filtration device has a limited capacity, and when that limit is fulfilled, it ceases to function advantageously. This device also operates under the precepts that the water going into the device is purified by a municipal water supplier and does nothing to kill any living microorganisms that may reside in the water.

There has also been a hit parade of multi-level marketing water filtration devices that have been available to the consumer. Most notably and widely distributed are the NSA water filter and the Amway water filter. Both of these devices are two stage devices consisting of carbon block filtration with a paper filter surrounding the cylindrical block. Both companies are in the market of selling the recharge cartridges; however, they are only two stage filters that do not address the elimination of microorganisms that are present in the water.

Yet another product available to consumers and seen frequently on network commercials is a device called the Pur water filter. This does utilize a very small and low wattage UV lamp and a carbon block filter; however, once again the same questions arise: 1) when has the UV bulb been used to the point that it cannot produce the necessary wave length to kill microorganisms in the water; and 2) when is the carbon block saturated? How does one ascertain the efficiency of any of these devices when the flow rate is not constant nor is regular maintenance scheduled to assure that all components of the whole are functioning at the maximum levels of efficiency? The answer should be clear that these devices do not allow this protection. The vast majority of these devices screw onto the end of a faucet and, once there, are forgotten while the consumer has a false sense of security that their family is protected and safe.

A device that is sold to a consumer that knows little, if anything, about water purification will have the exact amount of faith in their device that they have in the sales person from whom they purchased it from. Once it is in place, purity is assumed; although in actuality with average usage, after 60 days any carbon block is saturated, after six months any low wattage compact UV bulb has lost its wave length efficiency, and the consumer has water that is actually worse than the water coming into the filter. Any carbon block after reaching its saturation point has the propensity to leach these over absorbed toxins back into the drinking water. This has a double dosing effect and makes these filters very problematic when not properly maintained.

Another issue that has not yet been addressed is carbon quality and its properties to actually remove contaminants from the drinking water. Carbon differs in grades from that commonly used as charcoal briquettes for Bar-B-Que and grilling foods to hobbyist grade, professional grade, laboratory grade, and up into scientific grades. Carbon is graded by its ability to absorb and remove toxins from water, air, and other aqueous substances. It is also important to note that the quality of carbon is the determinant factor for setting the price; therefore, the generally accepted principle that carbon removes toxins from water is only as good as the quality of the carbon contained therein.

Regarding the deionization aspects of the water purification industry, few consumers would even recognize the term ion exchange resin media, nor do they know that there are differing resins that are specifically designed to remove differing spectrums of ions. Regeneration chemical solutions are unknown to almost all of the public consumers and the possibility that the regeneration process could introduce toxic chemicals from the regeneration chemical solutions into their water designed for industrial purposes would never even enter their minds.

By far, the vast majority of the deionization business done throughout the world is conducted by a handful of large water softening companies. The units are rented and serviced on a monthly basis. Once a month, the brine tank is refilled with sodium chloride (NaCl). These units only contain cation beds which are positively charged to remove the majority of the mineral spectrum of ions from the water, i.e., calcium and magnesium. This spectrum of minerals reduces mineral buildups in faucets, tubs, water heaters, and any other appliance in the home that requires water. However, sodium (Na) has long been a known cause of medical problems that are mainly associated with the cardiovascular system to include: high blood pressure, heart attack, and stroke. These companies know that the public is aware of these risks and have countered by simply running a bypass line from the incoming water supply upstream from the softener, and running a line and faucet to the sink. This does eliminate exposure to the sodium that is released into the rest of the home; however, the water for human consumption is not treated nor purified. This leaves the consumer vulnerable to any water-borne contaminants that may be present in the incoming water supply. This seems a bit of a paradox, the ice maker, tub and hot water heater are protected while the owner is left totally vulnerable.

In the past two years, some of these companies have tried to avoid these bypasses and protect the consumer with an under the sink two stage process unit to remove the sodium which utilizes a process universally known as reverse osmosis. Reverse osmosis is a process in which water is forced through a semi-permeable membrane in which the openings are smaller than the sodium molecule. This is a VERY slow process and the largest units yield only 30 gallons of sodium free water in any given 24 hour period of time. The water is then run through a carbon block. The greatest problem with reverse osmosis, other than the obvious low production quantities, is would you ever require more than 30 gallons of sodium free drinking, cooking, water for ice, etc.? That is, assuming that you paid for the larger unit; many units only yield 10 gallons per 24 hours of time. The danger in reverse osmosis lies in the fact that this semi-permeable membrane is very delicate, and particles held behind the membrane gradually reduce the amount of water that can pass through the membrane. This often causes a pressure build-up and a ruptured membrane. When this membrane ruptures, all that it has held behind it hits the drinking water at once in a spike, and the water is once again impregnated with deadly sodium. Once again, the lack of knowledge that the consumer possesses is very little and they may never know that the membrane is breached. This places the family that believes that it has done all it can do to provide its members with good quality drinking water at a risk of which they are unaware exists, and is paying for that quality monthly.

For all of these examples, the simple fact is that public drinking water quality continues to spiral downward at a far greater rate than the population is growing.

SUMMARY OF THE INVENTION

With the foregoing in mind, the present invention advantageously provides a water purifying apparatus which may be made small enough to sit on a counter top, or big enough to purify water for a small community, while producing virtually the same level of purity. The present invention also advantageously provides a water purifying apparatus and methods which produce water that far exceeds the quality and purity of all known public water supply sources.

Having all of the deficiencies that exist in the devices currently marketed in the water purification industry and the elimination of said deficiencies as its expressed objective, as addressed in the entirety of the application contained herein, that the present invention has addressed and rectified these deficiencies, and has been tested to attest within a great degree of certainty as to the claims made herein.

The water filtering apparatus can include a six-staged process wherein known principles of water purification have been assembled and built in modular connected stages, some of which the standard usage methodologies have been altered to obtain greatly enhanced efficiency that has hereto been achieved.

More particularly, an apparatus for purifying water comprising is provided which preferably includes unpurified water supplying means for supplying unpurified water, demagnetizing means positioned downstream from the unpurified water supplying means for applying a magnetic field to the unpurified water to thereby remove particles containing ferrous metal therefrom, and ion exchange media exposing means positioned downstream from the demagnetizing means for exposing the water having the ferrous metal containing particles removed therefrom to ion exchange media having first and second conductivity types to thereby remove charged molecules from the water. The apparatus preferably also includes carbon filtering means positioned downstream from the ion exchange media exposing means for filtering the water having the charged molecules removed therefrom, paper filtering means positioned downstream from the carbon filtering means for filtering precipitates from the water after passing through the carbon filtering means, and ultraviolet light exposing means positioned downstream from the paper filtering means for exposing the water after passing through the paper filtering means to ultraviolet light to thereby kill all life forms therein.

Methods of purifying water are also included according to the present invention. A method of purifying water preferably includes applying a magnetic field to the unpurified water to thereby remove particles containing ferrous metal therefrom, exposing the water having the ferrous metal containing particles removed therefrom to ion exchange media having first and second conductivity types to thereby remove charged molecules from the water, filtering the water having the charged molecules removed therefrom with a carbon filter, filtering precipitates from the water after passing through the carbon filter with a paper filter, and exposing the water after passing through the paper filter to ultraviolet light to thereby kill all life forms therein.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

Figure 1:
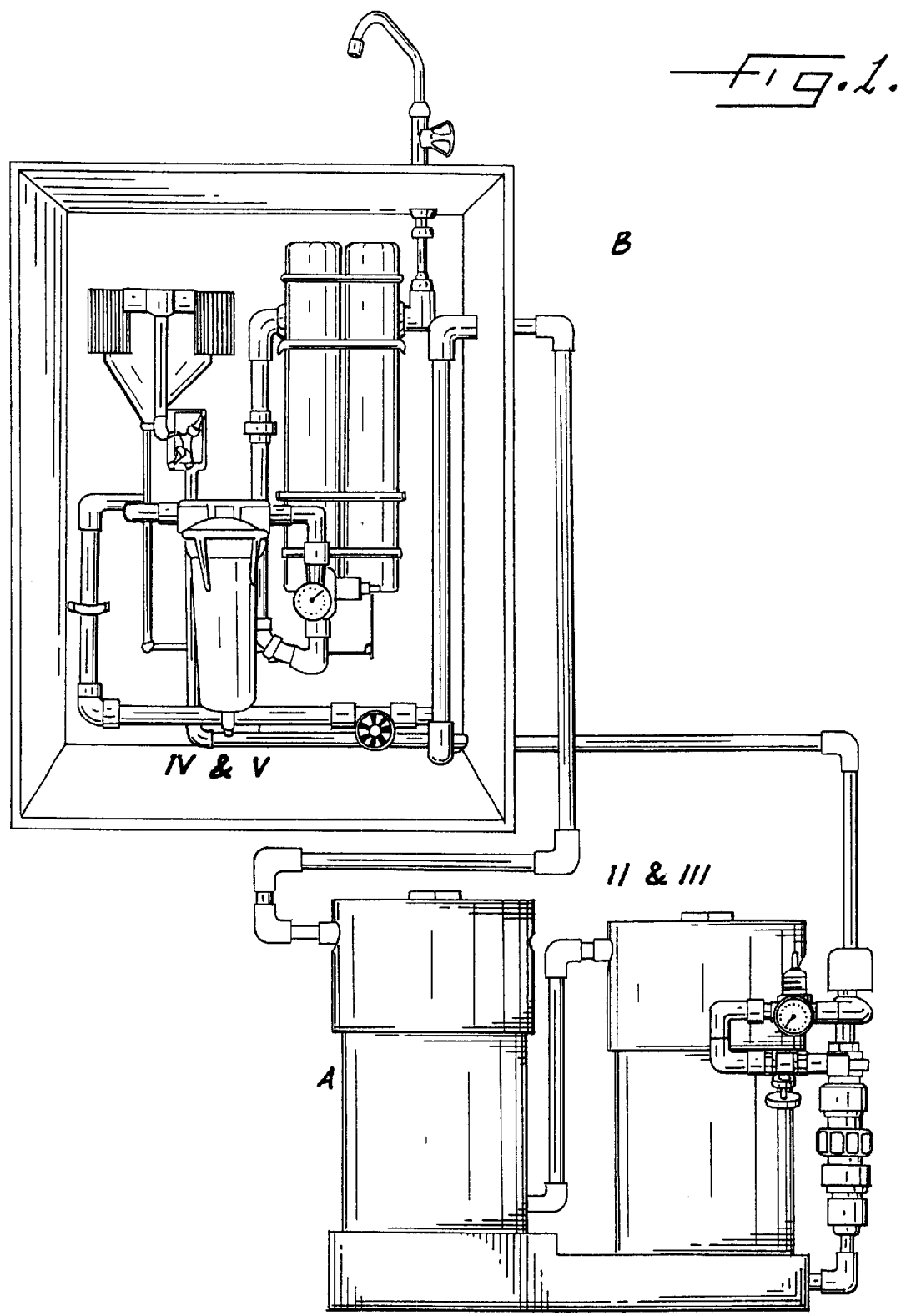
FIG. 1 is a front elevational view of a water purifying apparatus according to the present invention.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

The first stage is a pre-filter chamber that is configured with 8 identical nickel plated neodanium permanent rare earth magnets measuring 1-inch×⅞-inch×¾-inch thick, and having a gauss rating of 14,200. The magnets are configured so that the pulling surfaces face inward and are mounted in an octagonal configuration so that each magnet is directly opposite from one of identical mass and magnetic properties. The magnets are epoxied around a 2¾" O.D. PVC tube and are encased with a vinyl shrink wrapping. This configuration creates an internal magnetic field with a gauss rating of 14,000 plus and is removable and filled with synthetic, nontoxic fibrous media, which is tightly packed inside to capture all particles containing ferrous metals, as well as converting dissolved calcium carbonate (CaCO3) into a crystallized molecule that may be removed in the following stages. This tube is removable making the removal of the build-up of ferrous metals possible, as well as inhibiting the growth of harmful microbiological life forms within the fibrous holding materials. This fibrous pre-filter media also removes any free floating precipitate matter, never allowing it to enter the system. The removal of these precipitates before entering the remaining five stages, coupled with the absence of the ferrous oxide molecules, substantially extends the intervals required for regeneration of the subsequent processes. As the continuous stream of water exists the pre-filter stage, the flow is immediately reduced to one gallon per minute by the use of a ½-inch pressure reduction valve with an attached gauge to display the pressure coming into the system in pounds per square inch (psi). This is one of the new and significant changes in the utilization of all of the following stages. The significant reduction in the flow rate allows longer contact time to enhance and maximize the efficiency of the device in its totality and produces ultra pure water as a result.

Stage two and three are the utilization of cation and anion resin exchange beads; the cation having a positive charge and the anion having a negative charge.

In these two parallel chambers that are also in fluid communication is another new and unique configuration in the use of ion exchange resins. It is a generally known fact that a bed of mixed cation and anion resins work far more efficiently in the deionization process; however, a mixture of resins with opposing charges, and relative in size to grains of sugar, do not allow for the separation of the opposingly charged beads for the process of regeneration. These two allow for the containment and retention of selected ion exchange media to remove undesirable charged molecules by the selection of ion exchange media that will have the maximum effect of regional, geographical, individual wells and municipal water supply systems; thereby, producing the purest water possible as dictated by the content of the water. These beads are retained in nylon mesh containment bags and stacked in the two large chambers in as many layers as desired, alternating charges to replicate the mixed resin bed principle; however, allowing the media to be separated and regenerated with opposing charged solutions, re-stacked, and successfully restore the mixed resin bed concept versus the use of a universal solution such as sodium chloride (NaCl), yielding a far less efficient process. Broadly speaking, ion resin exchange media are in the form of granular sized beads and made of specific plastics which have properties that would possess a neutral conductivity charge, a tacky surface that would lend itself to attract and hold a charged ion from a solution to which it is exposed and retain said charge. The breaking down of the media into granular beads maximize the surface of any bed of resin exchange media; therefore, greatly enhancing its ability to hold the maximum amount of any charge to which the selected regeneration solution exposes the maximized surface area.

Once a charge has been placed on the surfaces of the ion resin exchange media, it will attract opposing charged ions, molecules, or particles of naturally occurring elements, and in some cases, other pollutants. When these ions are attracted to the opposingly charged resin media, the ion is trapped by the physical nature of the tacky plastic composition of the bead, and the originally placed charging ion is released or "exchanged". Over time, and in a direct correlation with the concentration of opposingly charged ions in the fluid passing over the totality of the surface area of the ion exchange media bed, it will capture opposingly charged ions and exchanges all of its originally charged ions. At this time, the exchange process stops due to total saturation, and regeneration of the resin is required. Generally speaking, as the resin media starts to become more heavily saturated with ions of the opposite charge, the efficiency decreases and regeneration occurs on a regularly scheduled time table to ensure maximum efficiency at all times.

The regeneration process requires the flushing of the exchange media to create an agitation in the bed to dislodge the captured ions as the regeneration solution exchanges the restored desired charge and exchanges the captured ions as it replaced itself in its original surface area of the resin bead. Immediately thereafter, the resin exchange media is rinsed with deionized water, or with water containing only molecules of like kind and of identical charge, to remove the excess solution utilized in restoring the original charge. Due to the fact that the specific designed use of this device is to produce ultra pure water for human consumption, the recharge solutions must be carefully selected and be non-toxic.

The cation process is generally charged with a salt. Universally, the term salt is assumed to be table salt or sodium chloride (NaCl); however, potassium chloride (KCl) is also a salt that will lend this process beneficial qualities, unlike those of the more common and universally recognizable sodium chloride (NaCl). There are many salts and the human body requires a certain amount of salt; however, the medical community has long attributed many diseases and maladies to excessive amounts of sodium (Na) intake. These include, but are not limited to, hypertension (high blood pressure) associated with substantially increased risks of heart attack and stroke, excessive water retention, and renal failure. Drinking water that is totally devoid of salts will draw the salt out of the human body and make it more susceptible to dehydration, heat stroke and severe muscle cramping. It is for this reason all bottled water for human consumption has small quantities of salt added. In most cases, they will be called electrolytes, another term broad and generally accepted as synonymous for a saline solution. For all of the aforementioned reasons, and due to the generalized global deficiency in the human body of potassium, potassium chloride (KCl) is the regeneration agent of choice for the cation resin media. This means that as negatively charged ions are moved and as the exchange process occurs, the molecule that is exchanged for these ions is potassium chloride, thereby, effectively adding back appropriate levels of salt that does not contain sodium (Na), rather, adding a historically universal element that is missing in the human diet. The anion process is regenerated with hydroxide (OH), a caustic solution in its chloride (Cl) form, rinsed to remove all excess solution within the bed, and as it captures positively charged ions, it releases a chloride (Cl) molecule. Proof that this is working is readily available in the independent EPA approved laboratory report of a comparative analysis of the raw water coming into the apparatus versus the same water after passing through this water purification process (collective to include the effects of all six stages). Total alkalinity (carbonate hardness) was reduced from 41 ppm to 25 ppm; total hardness (general hardness) was reduced from 140 ppm to 30 ppm; nitrate (NO3) was reduced from 1.9 ppm to 0.5 ppm; selenium (Se) was reduced from 0.005 ppm to below detectable amounts; sulfate (SO4) was reduced from 170 ppm to 65 ppm; and zinc (Zn) was reduced from 0.03 ppm to 0.02 ppm (refer to FIG. 5 attached herein). Conversely, both the Specific Conductivity and Total Dissolved Solids (TDS) increased due to the rise of chloride (Cl) molecules caused by the exchange of the potassium chloride (KCl) and the hydroxide (OH) in a chloride (Cl) form for the charged particles removed from the water on the resin media surface. These three elevations are chemical proof that the exchange process is working well and are reported as follows (all well below EPA maximum allowable standards): Specific Conductivity rose from 560 umhos/cm to 750 umhos/cm (no EPA standard established); Total Dissolved Solids (TDS) rose from 330 ppm to 440 ppm, EPA maximum standard is 500 ppm; and chloride rose from 31 ppm to 160 ppm, just over half of the EPA maximum standard, which is set at 250 ppm (refer to FIG. 6 attached hereto).

Stages 1, 2 and 3 are embodied in a separate device that shall hereafter be referred to as the Deionization Unit and may be placed in a remote location of convenience for utilization in homes with or without basements, trailers and apartment buildings. This does not infer nor limit the use of a portable and compacted unit embodying all six stages for emergency use in the event of natural or man-made disasters when the public water supply has been contaminated, nor exploded versions large enough to supply a small city in which each stage is a separate entity with fluid communication. The configuration of the prototype done specifically for the testing of the combination of scientific processes and the effectiveness thereof, as per the attached drawings. Although the submitted configuration may be similar to a home unit production model, its final configuration will be more compact and lend itself to the injection molding process.

The Deionization Unit shall be connected to the fourth stage via flexible reinforced clear PVC tubing, or ¾-inch schedule 40 PVC rigid standard plumbing running under the sink area, which shall have the outlet mounted on the counter top and utilize the ultra pure water for drinking and cooking purposes. The fourth and fifth stages shall be contained within a polyvinyl chloride (PVC) injection molded container having an inlet flowing directly from, and in fluid communication with the Deionization Unit into the top of a solid activated carbon (C) block (Stage 4) with a hole drilled to a depth to leave a bottom equal to the thickness of the walls of said cylindrical block, and shall pass immediately through an ultra fine paper filter (Stage 5), which is wrapped around said block on all sides and retained there by a non-porous, non-toxic plastic netting that is tightly fitted to retain any precipitate matter that could have migrated the length of the process, however, unlikely that may be. After having passed through stages 4 and 5, the water shall be captured in the enclosed body of the container and moved to the exit on the opposite side of its entry to the device. This configuration shall heretofore be referred to as the filtration unit, its contents as the filter cartridge, and shall be replaced at regular regeneration intervals, simultaneously with all other processes.

Once again, the independent comparative test analysis bears this claim out resoundingly. Turbidity was reduced from 0.2 Nephelometric Turbidity Units (NTU) to below detectable quantities; phenol was reduced from 0.009 ppm to below detectable quantities; bromodichloromethane was reduced from 2.8 ppb to below detectable quantities; chloroform reduction was from 29 ppb to below testable quantities; dibromochloromethane was reduced from 1.3 ppb below detectable quantities; and Total Trihalomethanes were reduced from 33 ppb to 2.0 ppb, (refer to FIG. 9 attached hereto). Please note that the incoming raw water contained no chlorine (Cl), nor ammonia (NH3/4); however, the water was treated with fluoride, although none was detected in the testing process. These tests clearly define the effectiveness of the abilities of the carbon (C) block filter to drastically reduce toxic gasses present in the water, and when added cumulatively to the aforementioned results, have made a drastic difference in the purity of the water for human consumption. The paper filtration process is a final safeguard that it is a virtual impossibility for any precipitate matter to exit the fifth stage. This filtration unit mounted on the back wall under the counter top to optimize storage space under the kitchen sink.

Before entering into the sixth and final stage, it passes through another adjustable pressure regulating device and gauge, which displays in-line pressure in pounds per square inch (psi). The purpose of this is to ensure the safety and structural integrity of the two internal crystal cylinders that are rated at 35 psi structurally, and through which an ultraviolet (UV) 25 watt lamp shall extend through each cylinder. This enclosed UV sterilization chamber is the sixth and final stage that the hereto unbroken stream has flowed through the magnetic field pre-filter at the beginning of this enclosed process. There is fluid communication through all stages in one direction, beginning as the water enters just prior to stage one, and terminating at the faucet that comes up through the counter top. When the faucet is opened and water moves in the system, a flow switch closes the normally open circuit that ignites the UV lamps. When the flow stops, the normally open circuit returns to its normal position and cuts power to the UV lamps. This extends the life of the UV lamps as well as being energy efficient. This unit is mounted in close proximity to the filtration unit on the back wall beneath the sink to further conserve needed cabinet space.

The exposure of the water to an ultraviolet light source is not a new concept in and of itself; however, in this refined process, and in a fashion that has heretofore been unknown nor patented, the manner in which the UV process is optimized makes this claim a new process and unique to the apparatus. The propensity of new technology is to make things faster and more powerful. In this process, utilizing the ultraviolet sterilization chamber has reduced the flow rate to one gallon per minute (gpm), thereby extending significantly the exposure time to the short wave UV radiated plural light sources and by increasing the total UV wattage to 50 watts. This process also utilizes two 25 watt UV lamps having separate power sources allowing for a back-up system of continued purification in the event of failure of one of the light sources.

UV short wave radiant light is the most effective and efficient way to kill all microbiological life forms that may exist at the end of this process. All bacteria, viruses, algae, and protozoan microscopic life forms are held together by very thin membranes composed of fatty acids known as lipids. In case of a true cell (having a nucleus), it is known as the cell wall. Bacteria and viral life forms are encased in a similar fashion and these walls too are easily permeated by the UV light rays. Ultraviolet light is the hottest end of the light spectrum and the 2,537 Angstrom light ray length is the most lethal to microbiological life forms, and UV light is universally accepted as a primary cause of skin cancer in human beings (example of UV destruction to cells). By slowing down the flow in such a drastic fashion, there is more than adequate time to permeate the cell wall or encasing membrane, which immediately ruptures the organism. Continued exposure to the UV radiant light source destroys all organs, organelles, and most importantly, shatters the DNA chain so that regeneration of any destroyed life-form is impossible. Please note that in the independent comparative laboratory analysis, the Heterotrophic Plate Count was able to culture 54,000 Colony Forming Units/ml, making it impossible to even ascertain a valid total coliform bacteria count. However, after running through the process embodied in this apparatus and defined herein, the independent laboratory was unable to culture a single CFU/ml, which is below the laboratory's ability to count. Once again I reiterate, if one assumes that as much as ½ of one hypothetical colony could have been cultured in the milliliter of water, which was cultured after having gone through this process, the water has been purified (free of all microbiological life forms) by a factor of 10 raised to the fifth power (refer to FIG. 11 attached hereto).

A 50 watt UV sterilization chamber is provided to kill all typical viral and bacterial life forms at a flow rate of 1,500 gallons per hour (gph), typical algae at 1,125 gph and typical protozoan life forms at a rate of 375 gph. Dealing only with the factor of time at a flow rate of 60 gph, the aforementioned kill rates would be multiplied by the following factors, respectively; 25 times, 18.75 times and 6.25 times. In dealing with UV intensity required to kill the same micro-organisms at the standard flow rates respectively, are 15,000 $\mu$watt-sec/cm$^3$, 22,000 $\mu$watt-sec/cm$^3$ and 45,000 $\mu$watt-sec/cm$^3$. Now dealing with intensities at 60 gph, the following UV intensity will remain constant at 60,000,000 $\mu$watt-sec/cm$^3$. Any cryptosporidium or cysts that would possibly, however improbable it may be, that had migrated through this entire process into the UV chamber, could not withstand this intensity for this period of time.

Figure 7:
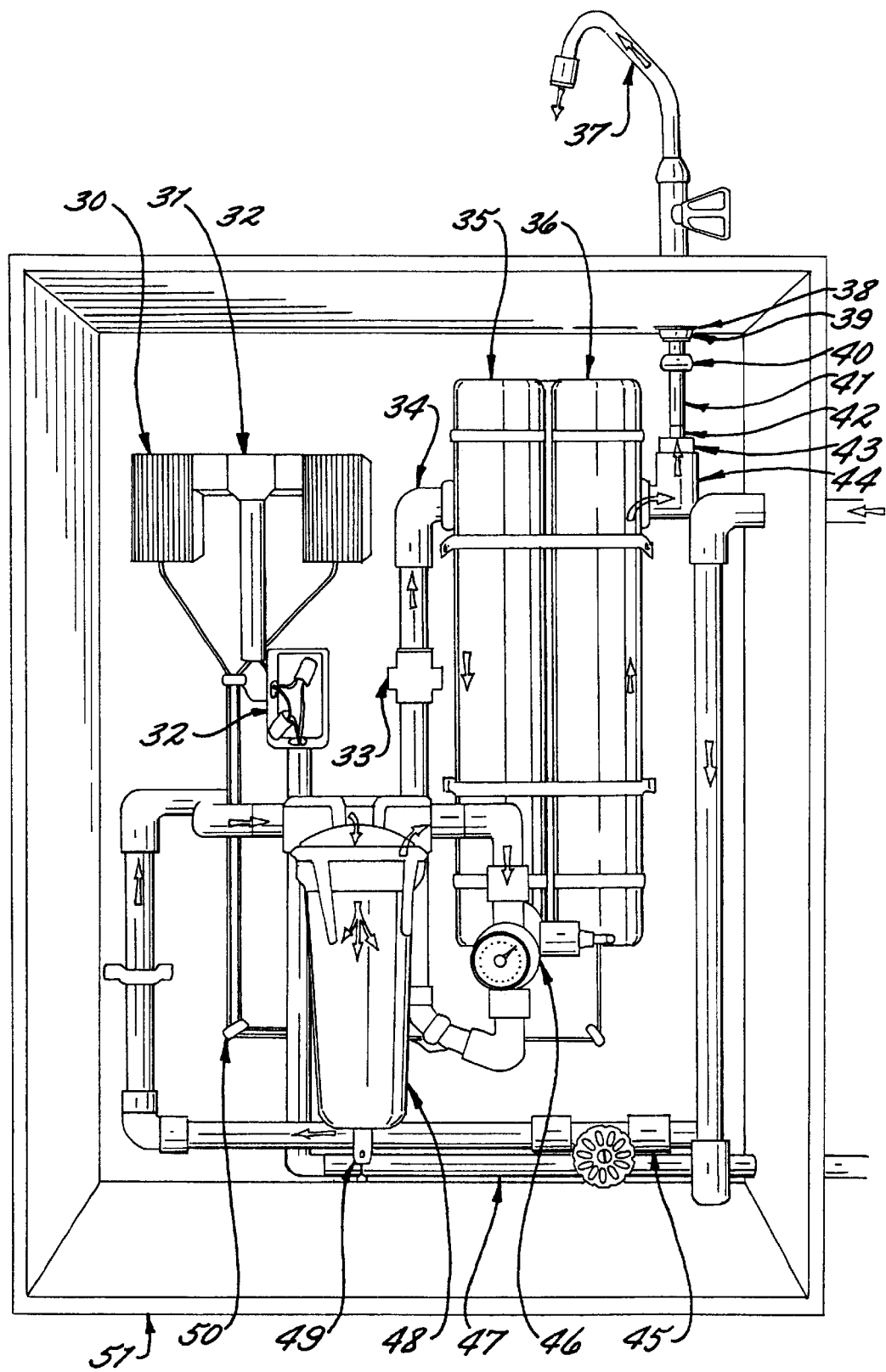
FIG. 7 is a front elevational view a filtration and sterilization unit of a water purifying apparatus according to the present invention.
Figure 10:
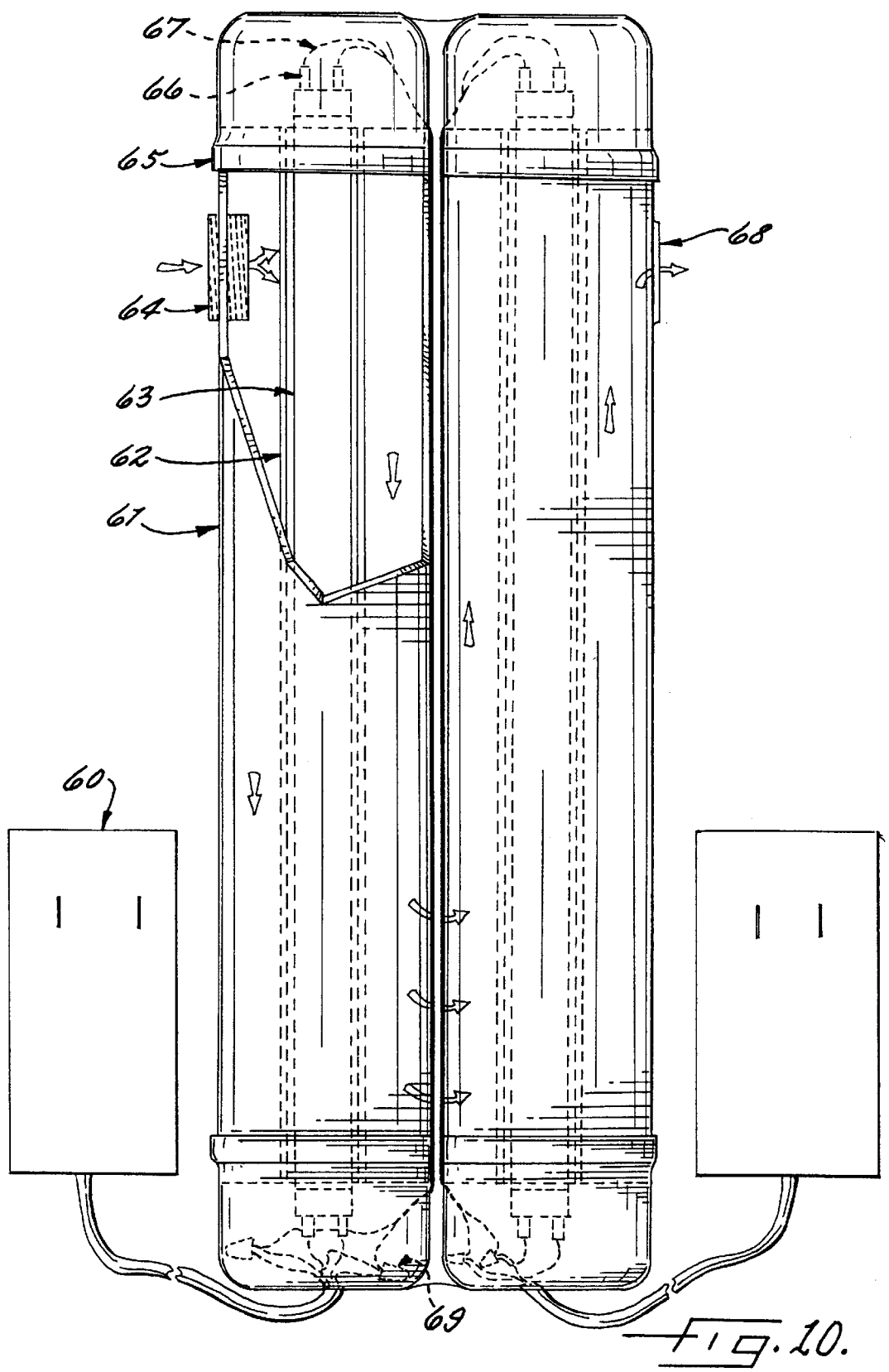
FIG. 10 is a fragmentary front elevational view of a ultraviolet sterilization container having high wattage intensities and each ultraviolet lamp having an independent power source of a water purifying apparatus according to the present invention.

For the purposes of utilizing an established world-wide network of existing service personnel having access and knowledge of the processes contained herein, this device and process shall be marketed to the residential market by the sale of licensing and marketing rights to an existing water softening company. The number of units sold will dictate the required purchase of the necessary items to regenerate these devices in the correct and optimum manner. Regeneration shall be defined as follows, in process order: Stage 1—on a monthly basis, and during the regularly scheduled delivery of salt to regenerate the existing water softening system, the tube on which the permanent rare earth magnets and containing a non-toxic, non-porous fibrous material 18 shall be unscrewed and removed allowing the fibrous material to be removed and repacked with clean and sterile media (see FIG. 3). It shall then be replaced to its original position and tightly screwed into place; Stages 2 & 3—during the same monthly service call, the threaded lids of the ion exchange media containers 5 shall be screwed out exposing the perforated PVC retention divider 23 and the category 3 stainless steel 120×120 mesh retention screen 24 shall be removed exposing the stacks of nylon bags which contain ion exchange media having charges of a first and second type 25, 26, and they shall be removed and replaced with identical bags containing regenerated ion exchange media having identical chemical properties and charges. These resin bags shall be stacked in the identical alternatingly charged stacks and the container shall be replaced to its original configuration in reverse order (as depicted in FIG. 2 and FIG. 4). (At the end of this description, I shall discuss at length the process of regeneration that shall occur at the water softening company shop to restore the appropriate charges to the ion exchange media; however, it is important to note that the modular design allows for timely regeneration and a minimum amount of time.); Stages 4 & 5—after having serviced the deionization unit A (as denoted in FIG. 1 and FIG. 2), the technician shall move to the area beneath the sink where the body of the filtration device shall be removed by unscrewing it from its threads 55 and the filtration cartridge shall be replaced with a new one of identical composition and configuration 56, 57, 58 (as identified in FIG. 8). The body shall be replaced and the unit checked to ensure that no leakage is present; Stage 6—moving from the filtration unit to the adjacent UV sterilization unit, it shall be activated by turning on the water faucet at its outlet 37 upon ignition of the UV lamps (as depicted in FIG. 7). Either the top or bottom pop-off connector shield shall be removed 65 to visually verify that both lamps are properly functioning. The caps shall be replaced upon verification thereof, and an adhesive label shall be attached to the front of the UV unit to log the annual replacement of the UV bulbs 63 (refer to FIG. 10). When one year has passed since the lamps have been replaced, the union 33 shall be unscrewed, the mounting straps 36 shall be removed to allow for the removal of all 4 of the connector shields 65 and the electrical connectors shall be removed 66 (removal seen in FIG. 7, replacement areas are seen in FIG. 10). The UV bulbs shall be gently pulled out through the crystal tubes 62, replaced with new bulbs and returned to its original position in reverse order (see FIG. 10).

By maintaining this maintenance schedule, the constant purity and quality of the water shall always be of the quality as reported by the independent laboratory tests.

Ion resin exchange media is regenerated by the water softening company by filling large fiberglass pressure vessels with the saturated media of like type that were removed from the deionization units during that day. The nylon bags are emptied into the vessels until they are at a predetermined level that will allow for the addition of the regeneration solution, a recycling agitation action, and then after the total release of the captured ions by the original charged solution are exchanged for the captured molecules and the original charge is restored throughout the entirety of the surface area of all of the like ion exchange media. The media is then flushed and rinsed for a period of time to ensure that all regeneration solution and released free ions are removed from the media. This rinsing process is done with deionized water for the purpose of retaining the charge reattached to the media surface, and to clear all of the aforementioned materials and captured matter. After regeneration, the mesh bags are refilled so that each ion exchange container in this device contains exactly one cubic foot of ion exchange media. Each module shall be placed in a holding tank in the trucks filled with deionized water and with like charged media for the manual exchange of the regenerated media modules for partially saturated modules in the devices that are to be serviced the following day.

From its conception and throughout its developmental and testing stages, it was always believed that this apparatus would work solely on the molecular level. The test data, however, has revealed new revelations that disprove the original belief that the cumulative actions contained within this apparatus are also working on the atomic level. All testing done on water for human consumption includes a screening for radioactive atoms, as well as any isotopes thereof. The amounts reported in the raw source was 0.12 Pico Curies Per Liter (pCi/L) and 0.5 pCi/L, respectively. After having been exposed to the six stages of this apparatus individually and cumulatively, these amounts were reduced to 0.05 pCi/L and 0.4 pCi/L, respectively (refer to FIG. 12 attached herein). Therefore, one can reach the conclusion that this apparatus creates water at a level of purity that cannot be replicated by any other means; not by any one of the parts of the whole process in and of itself, rather as a cumulative effect caused by all of the processes acting together as an integrated entity, making water at a level of purity that can extend life on earth.

Figure 2:
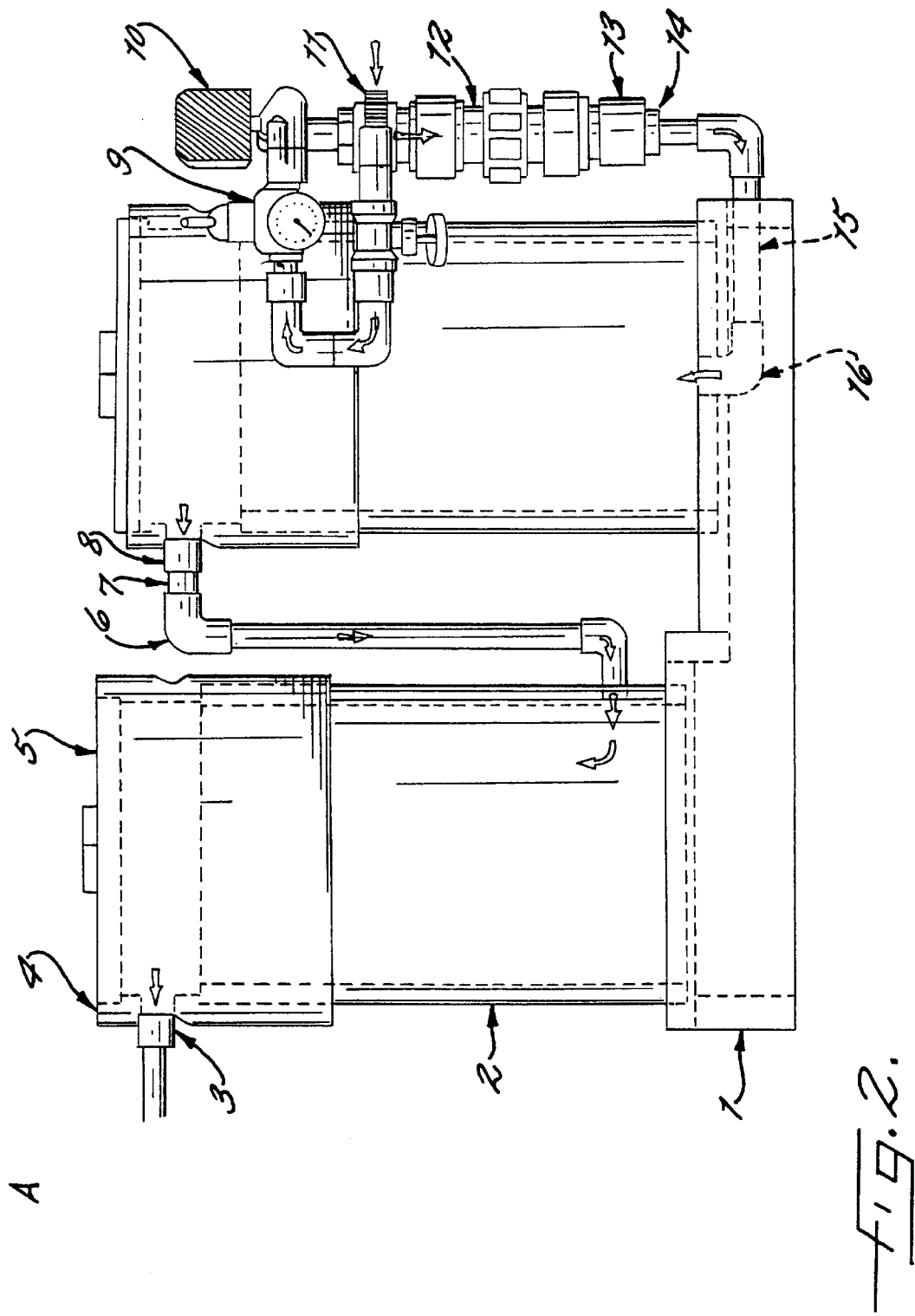
FIG. 2 is a front elevational view of a deionization unit of a water purifying apparatus according to the present invention.

FIG. 1 illustrates a front elevational view of the water purifying apparatus described herein. It is in two distinct modules denoted as A which identifies the deionization unit, and B identifies the filtration/sterilization unit. All six of the stages are located and denoted with Roman numerals. I identifies the contained magnetic field 19 and 20, which is filled with a fibrous media 21 (depicted in FIG. 3); II & III identify the parallel containers that contain the ion exchange media having opposing conductivity types in mesh bags and are arranged in alternatingly opposite charges 25 and 26 (see FIG. 4); IV & V identify the carbon block and paper filtration stages 58 and 57(identified in FIG. 8), respectively; and VI identifies the ultraviolet sterilization unit (FIG. 10).

FIG. 2 illustrates the deionization unit also identified as A in FIG. 1. 1 is a base having two platforms and constructed of ¾" flat PVC; 2 are two identical sections of 12" schedule 40 PVC pipe having an I.D. of $11^{15}/_{16}$", an O.D. of $12^{3}/_{4}$", a wall thickness of 0.404", a length of 18 inches, and is cemented, drilled, screwed and epoxied into a ½" deep channel machined into the base; 3 is a 1" male NSPT threaded×1" female glue fitting cemented into a drilled and tapped NSPT opening in the side of the 12" pipe; 4 a standard 12" PVC clean-out fitting cemented over the top of the 12" PVC pipe; 5 is a standard NSPT threaded matching lid that screws into the clean-out fitting; 6 is a standard 1"×1" elbow having female glue openings on both ends; 7 is 1" schedule 40 PVC rigid pipe; 8 is previously described as number 3 of this figure; 9 illustrates a ½" brass pressure regulation valve having a gauge that reads from 0–60 psi; 10 depicts a ½" brass flow switch wired to the "normally open" circuit; 11 is a ¾" female NSPT×¾" female standard hose thread brass coupling; 12 is a standard PVC pressure coupling; 13 is a 2"×2" female PVC coupling; 14 is a 2" male×1" female PVC bushing; 15 is a section of 1" schedule 40 PVC pipe; 16 is a standard 1"×1" elbow having female glue openings on both ends; and 17 is a 1" plastic directional shut off valve.

Figure 3:
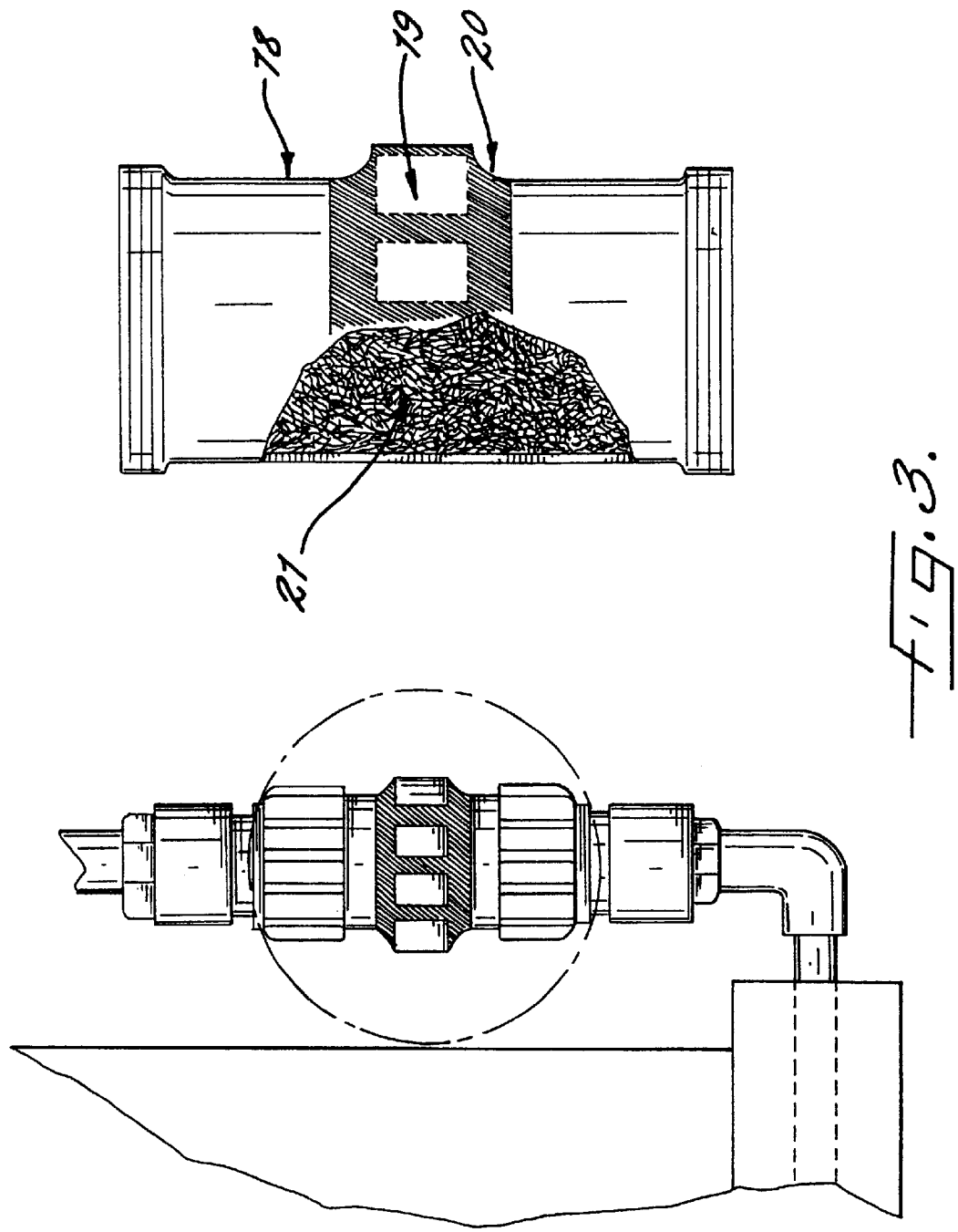
FIG. 3 is an enlarged fragmentary front elevational view of a permanent rare earth magnet induced field and the fibrous holding material contained therein of a water purifying apparatus according to the present invention.
Figure 4:
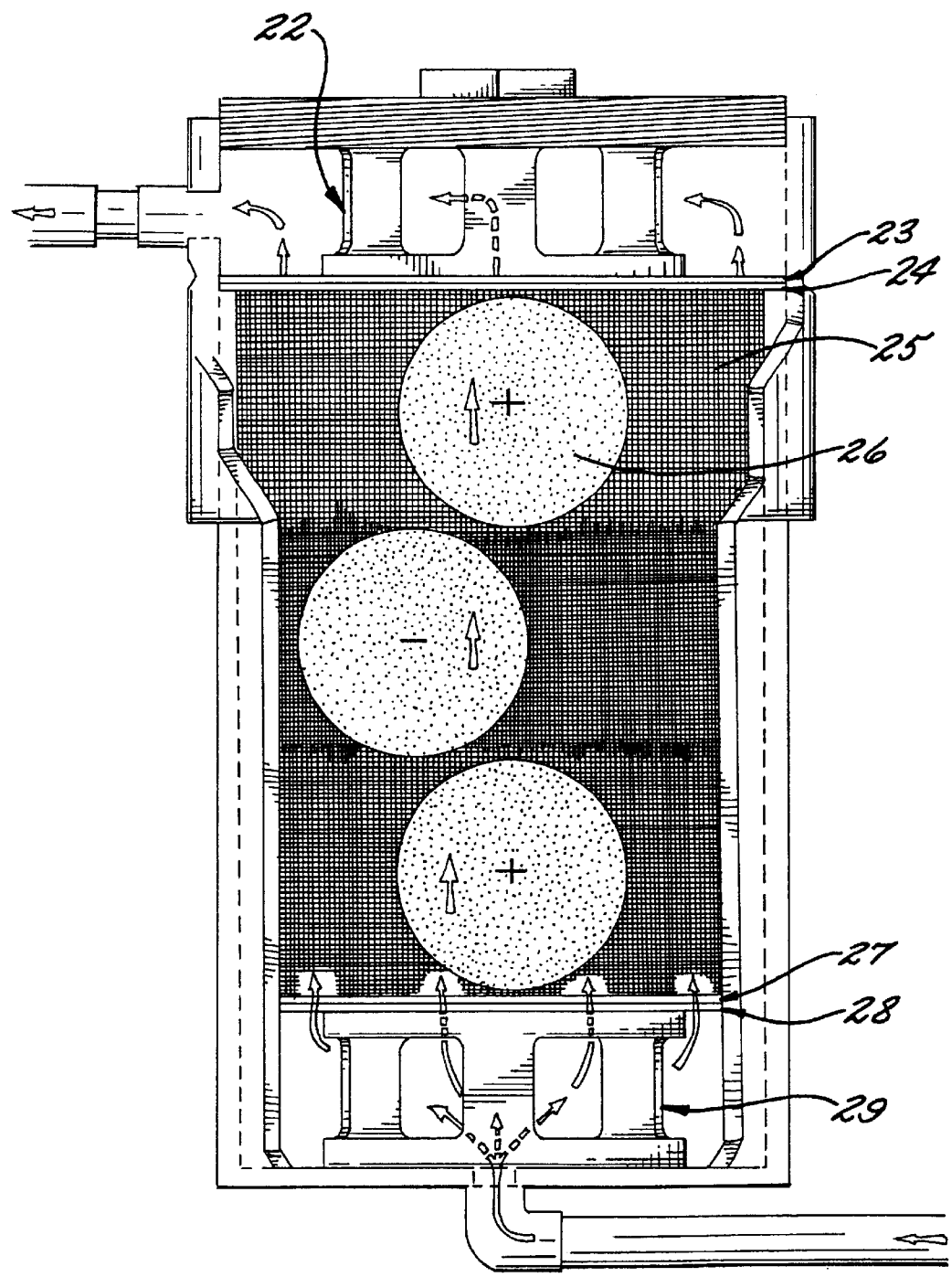
FIG. 4 is a fragmentary sectional view of one of the ion exchange media containers having modular alternating charges to replicate a mixed resin bed deionization process of a water purifying apparatus according to the present invention.

FIG. 3 illustrates an exploded view of Stage I which is built on and into the removable PVC section of the 2" PVC pressure coupling. 18 is a removable section of a standard 2" PVC pressure coupling having a wall thickness of $^{3}/_{16}$"; 19 are 8 identical 1"×⅞"×¾" thick nickel plated permanent rare earth neodanium magnets having a gauss rating of 14,200 epoxied to item 18; 20 is black vinyl shrink wrapping; 21 is polyester fiber tightly packed within the removable cylinder described in 18.

FIG. 4 illustrates a cut away view of the interior of one of the 12" cylindrical containers embodied in the deionization unit in FIG. 2. A. (Note:

this arrangement would be indicative of the first container, the charges would be reversed in the second container so that as the water passes through both containers it is exposed to opposite charges alternating according to charge type. 22 is a 6" I.D. PVC retention device having a complete circle ½" high on the top and bottom with ¾" braces configured in a tripod arrangement allowing the uninterrupted flow of water into and out of the container while holding the ion exchange media retention screens firmly in the center as the outside edge sits on the interior surface of the 12" pipe inside the clean out fitting. A 3" tall section is placed inside the bottom of the containers to secure the edges in the bottom while being supported in the center by this described device. The maintained media retention area is 16" in height, which holds exactly one cubic foot of ion exchange media. Each device is 3" in height. 23 is a ⅛" perforated PVC disk having 40 holes per square inch, each having a diameter of 2 millimeters; 24 is a category 3 stainless steel mesh having a 120×120 opening pattern per square inch. It is laced onto the perforated PVC disk as described in item number 23 with non-toxic monofilament nylon to ensure the retention on the ion exchange media within its designated area; 25 is a non-toxic nylon mesh bag closed at the bottom, filled with ion exchange media and securely tied with a nontoxic plastic pull tie; 26 is ion resin exchange media as contained in all bags as described in item number 25 each capable of having a specific conductivity type; 27 is a ⅛" perforated PVC disk having 40 holes per square inch, each hole having a diameter of 2 millimeters; 28 is a stainless steel screen having a mesh of 60×60 openings per square inch. It is rigid and held between item number 27, 29 and 1 3" section of 12" PVC pipe resting against the interior wall of the container; 29 is an identical device as described in item number 22.

Figure 5:
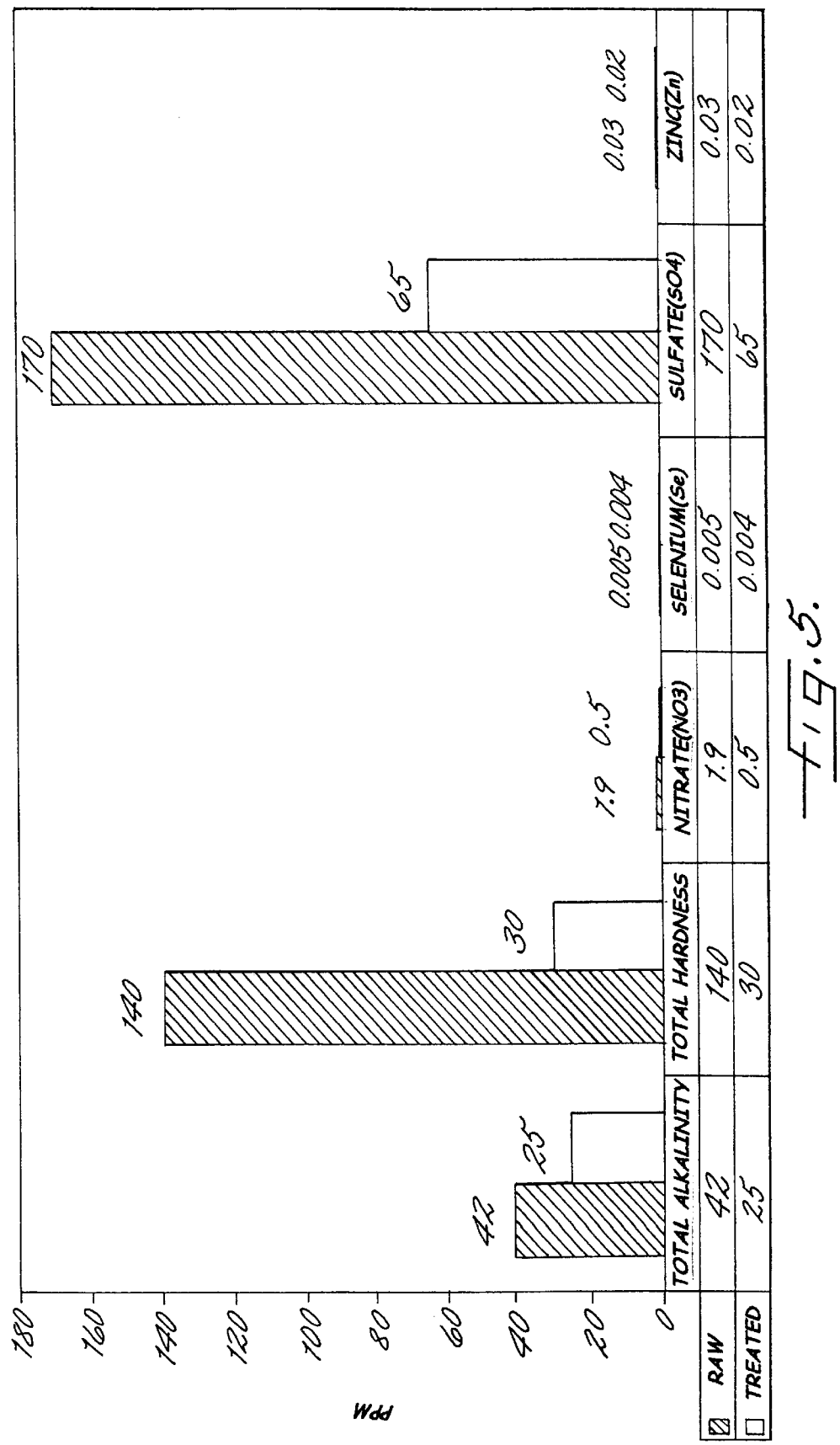
FIG. 5 is a graph of water parameters reduced by ion exchange showing the drastic reduction of six key elements taken from independent laboratory test results and which indicate that the deionization processes are reducing key elements in significant quantities according to the present invention.

FIG. 5 is a graph depicting 6 of the most significant parameters reduced by the ion exchange process. Included in these elements are Total Alkalinity (Carbonate Hardness) and Total Hardness (General Hardness) the combination of the two make the water softer, thereby extending the life of appliances and fixtures utilizing water, however, without putting the consumer at risk by sodium exposure. Nitrate is also reduced (NO3), this molecule is the end result of the aerobic process by which ammonia is detoxified in our ponds, lakes, rivers and streams, in more common terms, this is a reduction in biologically processed fish waste. Sulfate is tremendously reduced and is notorious for water discoloration, mineral deposits and a distinctive odor and taste in the water. Also reduced to lower levels are Selenium (Se) and Zinc(Zn), which are heavy metals that need not be in public drinking water.

Figure 6:
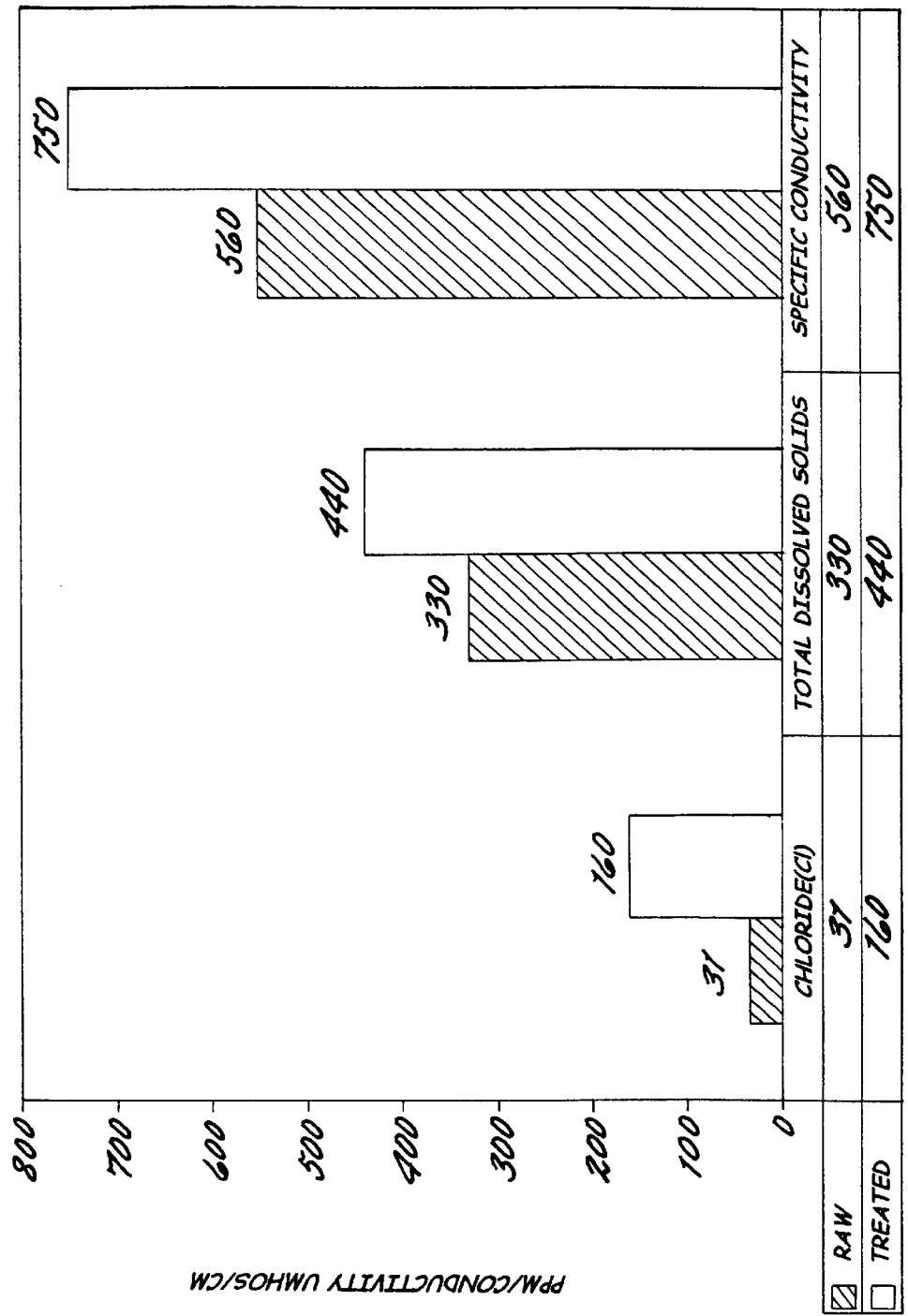
FIG. 6 is a graph of water parameters increased by ion exchange showing the increase in three tested parameters that indicate that the ion exchange process is functioning properly according to the present invention.

FIG. 6 is a graph depicting 3 parameters that are increased, thereby indicating the efficiency of the ion exchange process. These elevated levels are indicative of the level of efficiency that the modular mixed resin bed is functioning as molecules are exchanged. Since the hardness levels fell drastically in FIG. 5, the increase in chloride (Cl) proves that these hardness molecules were, in fact, exchanged for a chloride molecule, thereby retaining the molecules showing a reduction in FIG. 5. Since the chloride is dissolved in the water, Total Dissolved Solids (TDS) would naturally increase, as would Specific Conductivity (the water's ability to conduct electricity). Water void of all other molecules except hydrogen and oxygen (H20O) is a very poor conductor of electricity. It is the ability to jump from additional molecules contained therein that enhance its conductive principles.

FIG. 7 is designated as module B, which is the filtration/sterilization module; 30 is a 118 volt, 60 Hz transformer and rapid start ballast which converts voltage and amperage to the proper levels to efficiently ignite and maintain constant power to the ultraviolet light tubes; 31 is a junction box which provides two plug-ins to supply current to the devices described in item number 30; 32 is an electric junction box (cover not shown) measuring 2"×3⅞"×1¾" connecting to the junction box as described in item number 31 and the electronic flow switch as depicted in FIG. 2, item 10 by ½" electrical conduit. Please note that all wiring is completed in this drawing; 33 is a 1"×1" union allowing for the yearly removal of the UV sterilizer for the purpose of replacing the bulbs; 34 is a 1" male NSPT×1" glue 90 degree schedule 40 PVC elbow; 35 is the ultraviolet sterilization unit, (Stage VI to be described in detail in a following drawing); 36 is a ⅝" perforated galvanized flexible strapping material utilized to secure the UV sterilization unit to the back cabinet wall with ½" #4 Phillips head screws; 37 is a stainless steel water faucet; 38 is a flat rubber gasket; 39 is a threaded retention nut to secure the faucet firmly to the counter top from underneath; 40 is a ⅜" compression nut connecting the ⅜ " plastic tubing to the faucet; 41 is ⅜" high pressure plastic tube; 42 is a ⅜" brass compression fitting having a ⅝" male threaded opposite end; 43 is a 1" male glue×⅝" female thread PVC bushing; 44 is a 1" male NSPT×1" glue 90 degree schedule 40 PVC elbow; 45 is a 1" directional flow plastic shut-off valve; 46 is a ½" brass pressure regulation valve having a gauge to ascertain accurately the pressure in the line, having the ability to read between 0–60 psi. This valve is adjustable to control the flow rate; 47 is a ½" electric conduit connecting the electrical junction box to the electronic flow switch; 48 is the filtration device, further described in greater detail in a subsequent drawing; 49 is a U shaped pipe clamp to secure the plumbing under the sink; 50 is an insulated staple to secure the electrical wiring from the electrical supply to the UV sterilization device; and 51 is a ½" AC plywood box.

Figure 8:
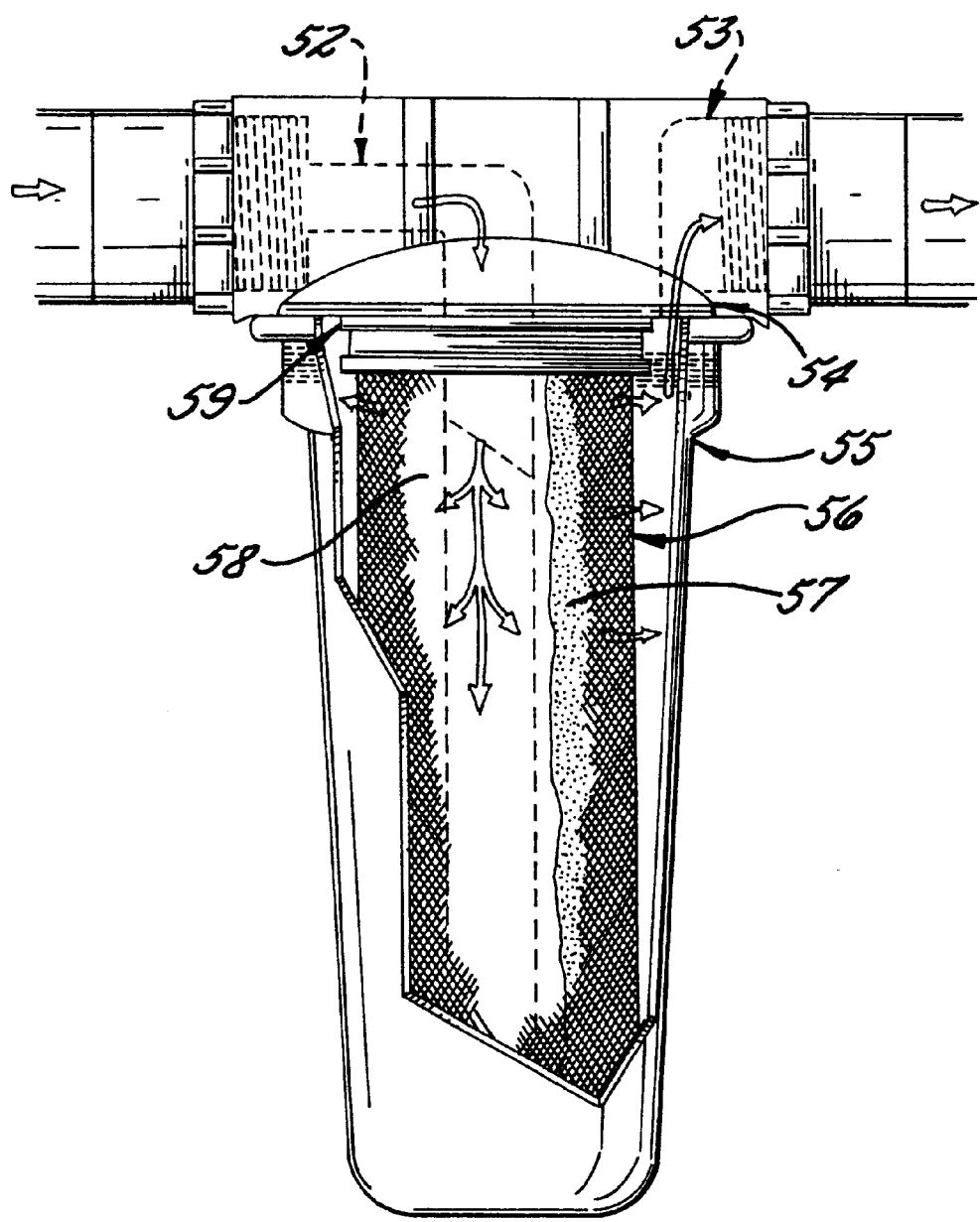
FIG. 8 is fragmentary front elevational view of a carbon block filter and a paper filtration unit of a water purifying apparatus according to the present invention.

FIG. 8 is an internal cut away view of the filtration unit which embodies stages IV & V of the apparatus defined herein. 52 is a channel through which water passes into the filtration unit and is extended to fit snugly into the hole that is drilled into the carbon block filter through which the water is forced by hydrostatic pressure; 53 is the exit channel through which the water exits the filtration unit after having permeating the carbon block filter, and immediately thereafter, the ultra-fine paper filter to fill the holding container forcing the water through this channel leading out of the filtration device; 54 is an O-ring that makes a leak proof seal when the bottom container is screwed off for replacement of the filtration cartridge, then replaced by screwing the container snugly against the O-ring to create a water tight seal; 55 is a removable threaded container; 56 is a non-toxic plastic mesh that is tightly wrapped around the filtration cartridge to hold the paper filter against the cylindric carbon block filter; 57 is ultra-fine paper filter media; 58 is the carbon block filter media; 59 is a rubber seal on both the top and bottom of the filtration cartridge to ensure that all water must pass through the carbon block and paper filters in order to enter the screw on container for exit from the filtration unit.

Figure 9:
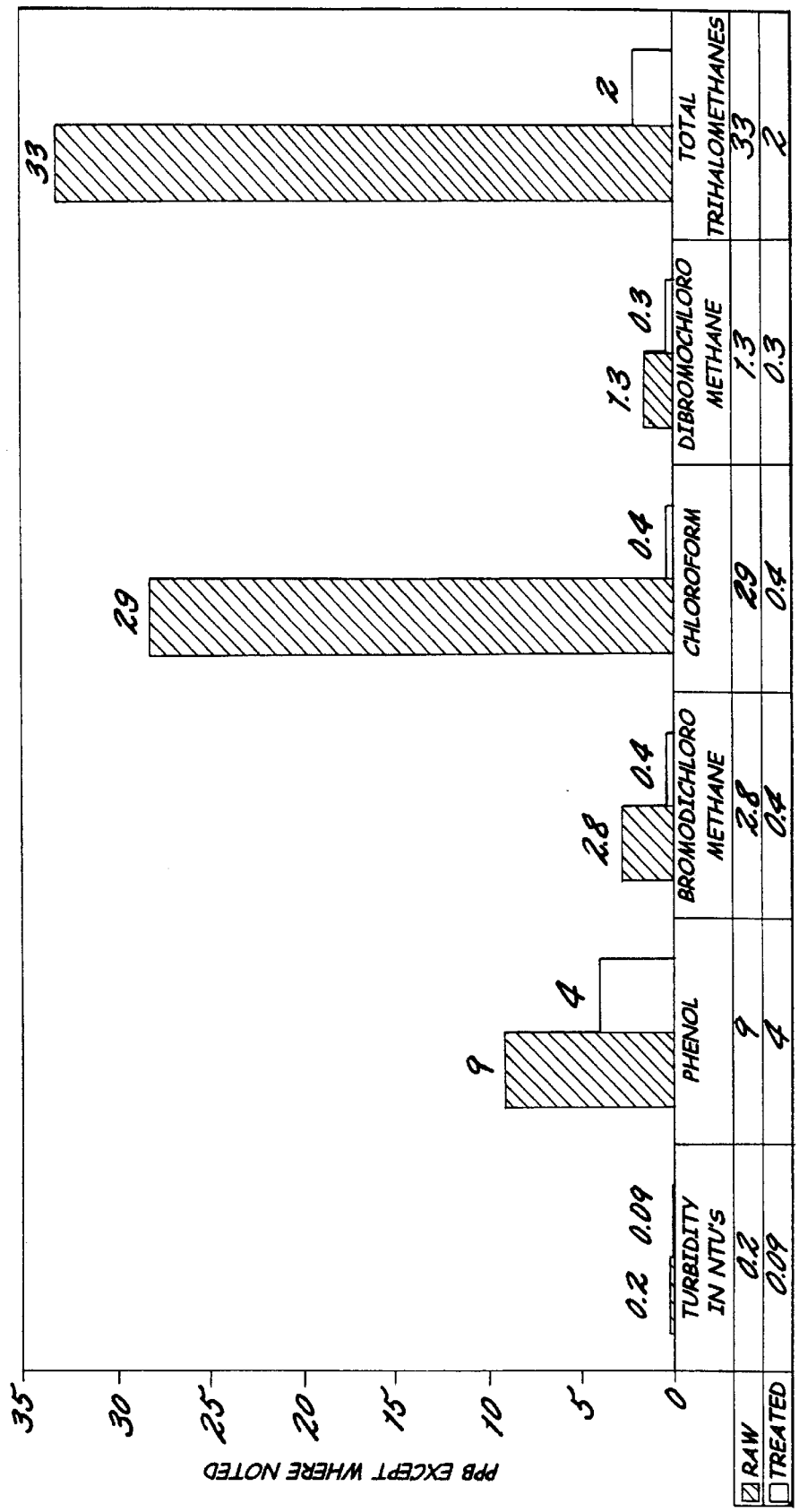
FIG. 9 is a graph of toxins reduced in six critical areas as reported by the independent test results indicating the efficiency of the carbon filtration configuration according to the present invention.

FIG. 9 is a graph depicting the drastic reductions in 6 key water parameters as reported by the independent testing laboratory. These reductions are due solely to the use of the carbon and paper filtration stages as embodied in the filtration unit. This graphic illustration by and large, shows the effectiveness of carbon (C) in the removal of gasses from the water.

Most dramatically reductions were noted in Phenol, Bromodichloromethane, Chloroform, Dibromochloromethane, and Total Trihalomethanes. Methane gasses are extremely toxic, and less we ingest, the more healthy we will be.

FIG. 10 is an illustration of the ultraviolet sterilization unit and a cut away view. This embodies the sixth and final stage of this process; 60 is a 118 volt, 60 Hz transformer and rapid start ballast that reduces the wattage to 25 watts and the amperage to 0.48 amperes. This unit supplies power to ignite and maintain one 25 watt UV lamp; 61 is the opaque injection molded PVC body of the UV sterilization unit; 62 is a quart cylinder extending form the top of the sealed exposure chamber to the sealed bottom two of these that are embodied in this device through which a 25 watt UV bulb runs from top to bottom. This configuration prevents the water and electric current from ever meeting to cause a short circuit. The cylinder is rated up to 30 psi, thereby making the use of a pressure reducing valve prior to entry a prudent safety precaution; 63 is a 25 watt UV bulb; 64 is a 1" threaded inlet through which water enters the UV exposure chamber; 65 is one of 4 molded plastic covers that pop off to allow the replacement of the UV bulb. It also serves to keep the electrical connectors dry as well as protecting the delicate prongs at each end of the UV bulbs; 66 is a copper friction connector that is crimped onto the ends of all 8 wires that connect to the pins on both ends of the two bulbs; 67 is insulated copper wire to carry the proper current from the ballasts to the bulbs; 68 is a 1" threaded outlet through which the sterilized water passes to exit the UV sterilization device; 69 is a wire nut used for making tight connections when splitting and splicing wires to power both of the lamps.

Figure 11:
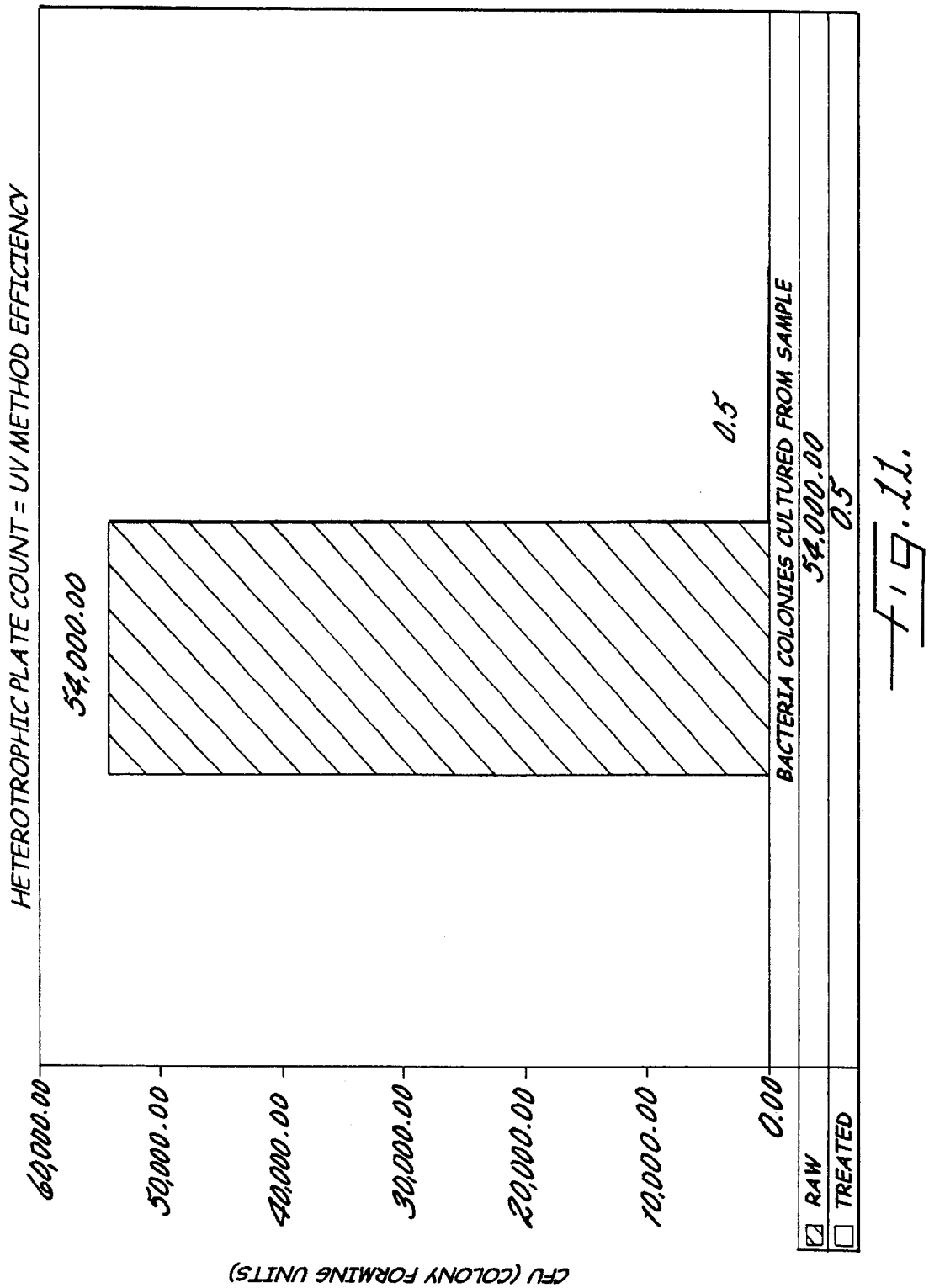
FIG. 11 is a graph of ultraviolet process efficiency which depicts the dramatic results reported by an independent EPA approved laboratory indicating the effectiveness of the utilization of the exposure to the ultraviolet light sources.

FIG. 11 is a very dramatic graph that depicts the phenomenal effect that the modified use of the UV sterilization process has yielded on the total number of bacteria colonies that could be cultivated both before exposure and after. A reduction from 54,000 Colony Forming Units/ml to below testable amounts would virtually prevent the spread of water-borne disease. This is phenomenal reduction is most certain to have a global impact in saving thousands of lives daily.

Figure 12:
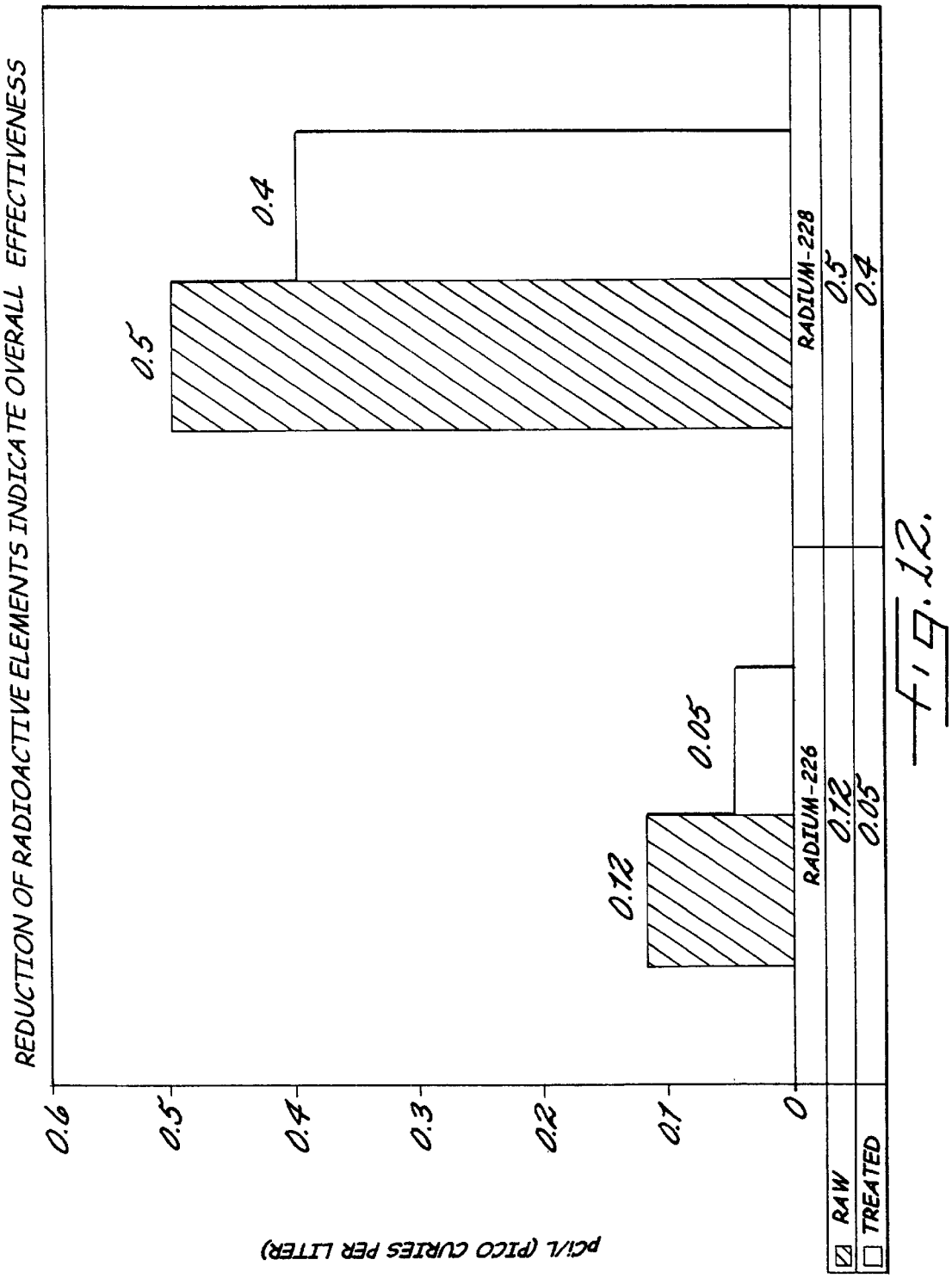
FIG. 12 is a graph of the reduction of radioactive elements occurring in the water sampled, tested, and reported independently, depicting the effectiveness of the composite stages of the device described herein as a functional unit.

FIG. 12 is a graph that illustrates the cumulative effect of all six of the stages contained herein working as a single process to achieve reduction levels below the molecular level and down to the atomic level by reducing radiation levels in naturally occurring radioactive elements and isotopes thereof. The graphic results in this figure was the most unexpected of all results. Any one of the six stages that comprise this process and the apparatus that embodies the precepts of each process were believed to be only at the molecular level during its inception, construction and testing phases. The substantial reduction in the radioactive atom, Radium-228 and its isotope, Radium-228 showed that working as a collective process in specific order, the process/apparatus could reduce radioactive materials contained therein; thereby, working on the water at the atomic level.

In the drawings and specifications, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. An apparatus for purifying water comprising:
   unpurified water supplying means for supplying unpurified water;
   magnetic field applying means positioned downstream from said unpurified water supplying means for applying a magnetic field to the unpurified water to thereby remove particles containing ferrous metal therefrom;
   ion exchange media exposing means positioned downstream from said magnetic field applying means for exposing the water having the ferrous metal containing particles removed therefrom to ion exchange media having first and second ion conductivity types to thereby remove charged molecules from the water;
   carbon filtering means positioned downstream from said ion exchange media exposing means for filtering the water having the charged molecules removed therefrom;
   paper filtering means positioned downstream from said carbon filtering means for filtering precipitates from the water after passing through the carbon filtering means: and
   ultraviolet light exposing means positioned downstream from said paper filtering means for exposing the water after passing through the paper filtering means to ultraviolet light to thereby kill all life forms therein.

2. An apparatus as defined in claim 1, wherein said ion exchange media exposing means includes a plurality of perforated containers, each of the plurality of perforated containers containing ion exchange media capable of holding a charge of a first or a second ion conductivity type, at least one of the plurality of perforated containers having ion exchange media having an opposite ion conductivity type than another one of the plurality of perforated containers in fluid communication therewith to thereby remove all charged molecules from the water and allow each of said plurality of perforated containers to be removed and regenerated with the original charge of the first or second ion conductivity type of the ion exchange media.

3. An apparatus as defined in claim 2, wherein each of the plurality of containers is modular and thereby readily removable and is formed of a non-toxic material and the each of one or more perforations in the container allow water to pass therethrough.

4. An apparatus as defined in claim 2, wherein said ion exchange media exposing means includes at least one flow reduction container positioned to reduce the flow rate of the water after passing from said magnetic field applying means to thereby increase the exposure time of the water to the ion exchange media, and wherein at least one of said plurality of perforated containers having ion exchange media therein is positioned in the at least one flow reduction container.

5. An apparatus as defined in claim 1, wherein said ion exchange media exposing means includes at least one flow reduction container positioned to reduce the flow rate of the water after passing from said magnetic field applying means to thereby increase the exposure time of the water to the ion exchange media.

6. An apparatus as defined in claim 1, wherein said ultraviolet light exposing means includes a flow reduction container which allows the flow rate of the water received after passing through said paper filtering means to be substantially reduced and at least one ultraviolet light source positioned in the flow reduction container.

7. An apparatus as defined in claim 6, wherein the at least one light source comprises a plurality of ultraviolet light sources so that the combination of the plurality of ultraviolet light sources provide a substantially high power of ultraviolet light for the flow rate passing through the flow reduction container, and wherein said ultraviolet light exposing means further includes a plurality of power supplies, each of the plurality of ultraviolet light sources having one of the power supplies connected thereto and each of the plurality of power supplies being separately controllable from the other power supplies.

8. An apparatus as defined in claim 1, wherein said magnetic field applying means includes trapping means for trapping the ferrous particles, said trapping means including a plurality of non-toxic fibers.

9. An apparatus as defined in claim 1, wherein said carbon filtering means includes a carbon filter positioned to remove at least odors, colors, and gases as water passes therethrough.

10. An apparatus as defined in claim 1, wherein said paper filtering means includes a paper material positioned to capture any smaller precipitate matter contained in water passing there through.

11. An apparatus for purifying water comprising:

an unpurified water supply positioned to supply unpurified water;

a magnetic field applicator positioned downstream from said unpurified water supply to apply a magnetic field to the unpurified water to thereby remove particles containing ferrous metal therefrom;

an ion exchange media exposing container positioned downstream from said magnetic field applicator to expose the water having the ferrous metal containing particles removed therefrom to ion exchange media having first and second ion conductivity types to thereby remove charged molecules from the water;

a carbon filter positioned downstream from said ion exchange media exposing container to filter the water having the charged molecules removed therefrom;

a paper filter positioned downstream from said carbon filter to filter precipitates from the water after passing through the carbon filter; and at least one ultraviolet light positioned downstream from said paper filter to expose the water after passing through the paper filter to ultraviolet light to thereby kill all life forms therein.

* * * * *